UNITED STATES PATENT OFFICE.

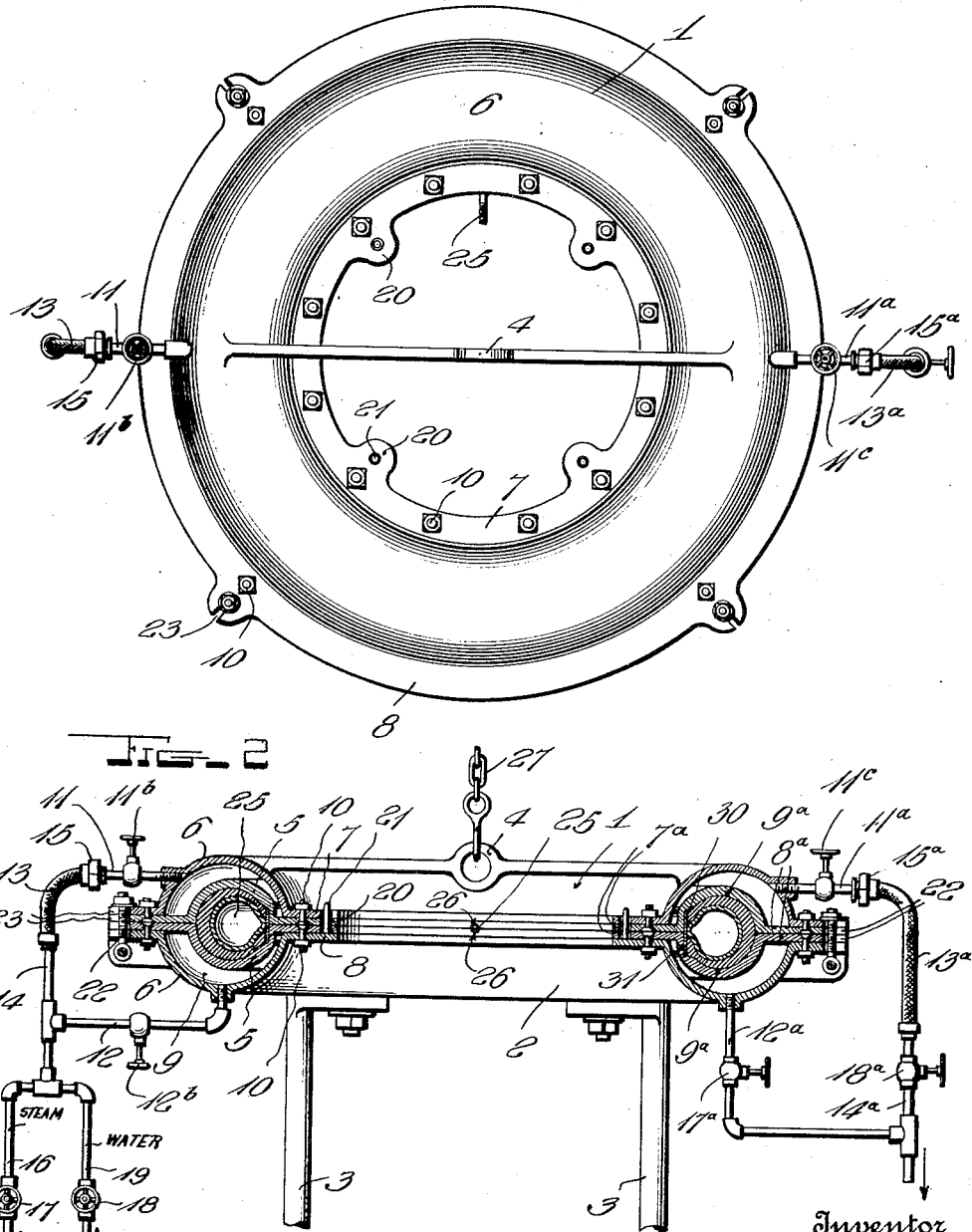

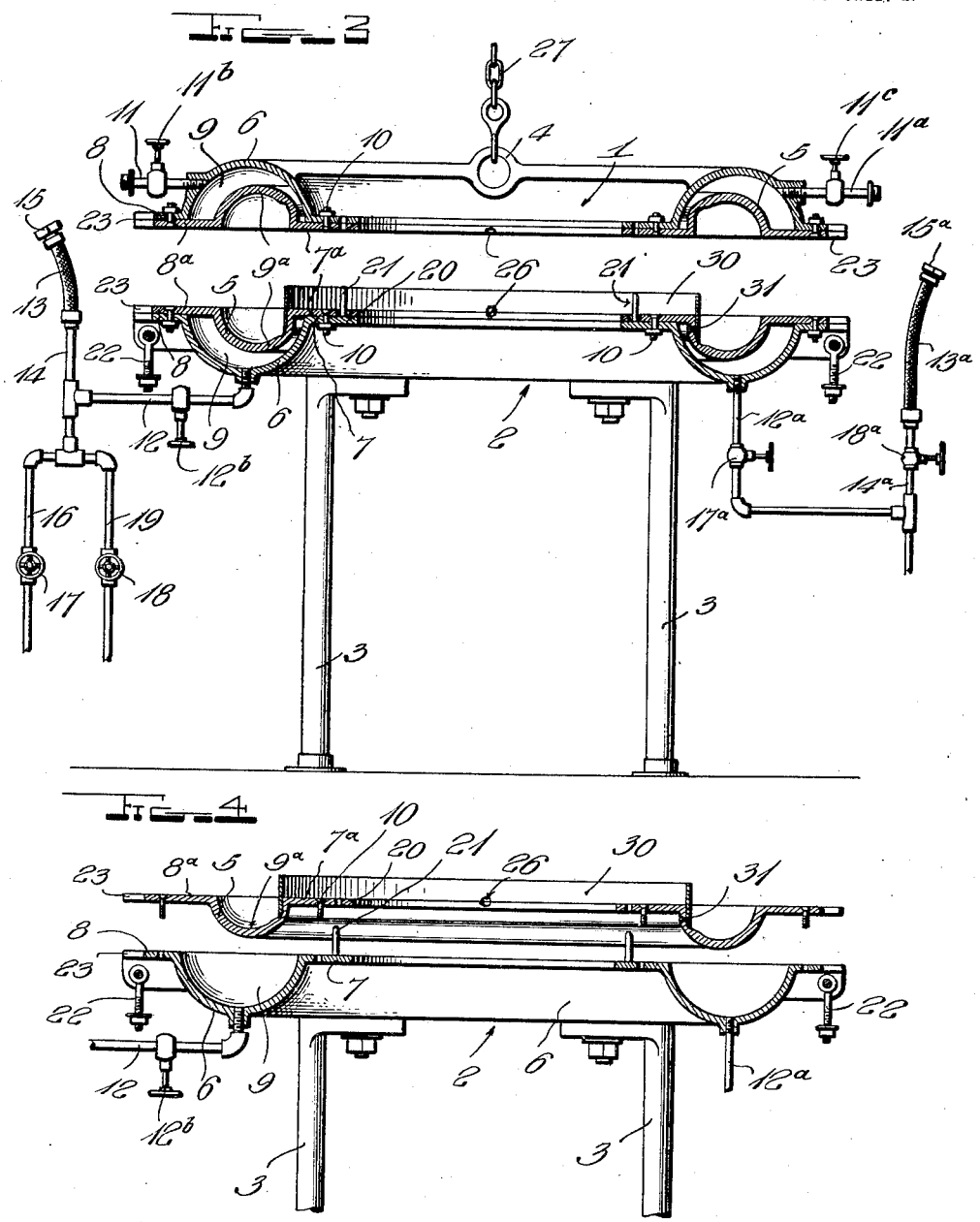

GEORGE B. COOPER, OF CLEVELAND, OHIO.

TIRE-VULCANIZER.

1,346,483. Specification of Letters Patent. Patented July 13, 1920.

Application filed April 3, 1919. Serial No. 287,134.

*To all whom it may concern:*

Be it known that I, GEORGE B. COOPER, a citizen of the United States, residing at Cleveland, in the county of Cuyahoga and State of Ohio, have invented certain new and useful Improvements in Tire-Vulcanizers; and I do declare the following to be a full, clear, and exact description of the invention, such as will enable others skilled in the art to which it appertains to make and use the same.

My invention relates particularly to that class of vulcanizers adapted to be used in tire repair shops and small factories, in which the initial expense of equipment is a highly important consideration. Heretofore it has been necessary to purchase separate molds for vulcanizing tires of different sizes and consequently the initial cost has excluded many from the field. I am aware that attempts have been made to provide a vulcanizer which will cure tires of different sizes, so that only one vulcanizer need be purchased, but for numerous reasons these attempts have proved impractical, with the result that the art still lacks an efficient vulcanizer for this purpose.

My invention has for its principal object to fulfil the requirements of the trade by the provision of a single, inexpensive, and easily operable vulcanizer which may be used for curing tires of numerous sizes; and in carrying out this end, a further object is to form the device of two hollow annular sections disposed side by side and provided with inner walls shaped to form the tire mold, said walls being readily detachable so that other may be substituted therefor, and by this means it is possible to vulcanize tires of all sizes with the same apparatus, provided sufficient mold liners are employed for adapting the vulcanizer as required.

A further object is to provide for coupling the two mold sections together without injuring the tire beads.

With the foregoing in view, the invention resides in the novel features of construction and unique association of parts hereinafter fully described and claimed, reference being made to the accompanying drawings.

Figure 1 is a top plan view of the vulcanizer.

Fig. 2 is a vertical section showing the vulcanizer in operative condition.

Fig. 3 is a view similar to Fig. 2, illustrating the manner in which the upper section of the vulcanizer is detached for removing the tire.

Fig. 4 is an additional vertical section showing the manner in which the inner wall of the lower section of the vulcanizer may be detached.

The vulcanizer is formed of an upper section 1 and a lower section 2, both of said sections being of annular shape and practically of the same construction. The lower section 2 is supported by suitable legs or the like 3 while the upper section 1 is provided with an eye or the like 4 by means of which it may be raised from the lower section to permit removal of the completed tire. Both sections 1 and 2 are hollow and their inner walls 5 are shaped to form a mold for the tire, said walls being detachable so that others may be substituted for vulcanizing tires of different sizes. Steam or any other suitable heating medium may be supplied to the interior of the sections 1 and 2 and after the process of vulcanizing, water or other appropriate cooling means may be forced through said sections to overcome the undesirable effects now often caused when allowing the cured tire to cool after its removal from the vulcanizing mold.

Specifically described, each section 1 and 2 includes a jacket section 6 in the form of a ring having projecting annular flanges 7 and 8 on its inner and outer peripheries respectively, said flanges being disposed at right angles to the vertical axis of the ring 6 and being preferably disposed in a common plane. Between the flanges 7 and 8, the jacket ring 6 is provided with a continuous channel 9 opening on the aforesaid plane. The ring 6 is preferably cast and is of uniform thickness throughout its width as shown, although this construction is not essential. The walls 5 may be specifically termed mold rings and these rings are provided on their inner and outer peripheries with flanges 7$^a$ and 8$^a$ located on opposite sides of their tire receiving channels 9$^a$. The flanges 7$^a$ and 8$^a$ contact respectively with the flanges 7 and 8 of the upper and lower sections 1 and 2 and are detachably secured thereto by bolts or the like 10, so that by removing these bolts, the mold rings 5 may be totally detached from the jacket rings 6; and it will be understood that several pairs of the rings 5 will be provided for use with the same vulcanizer, each pair having channels 9ª of different size, so the tires of all sizes may be cured in the same device. If desired, the channels 9ª may be provided with such internal configuration as to impart a rough tread to the tire, although I have shown no such construction in the present case.

I have termed the parts 5 mold rings since they form the mold for the tire, and similarly have designated the parts 6 as jacket rings, in view of the fact that they form a steam jacket around the mold rings, and it will be seen that each jacket ring and its respective mold ring form a complete hollow ring or section into which the heating medium may be supplied in any preferred manner. For illustrative purposes, I have shown a short pipe 11 extending into the upper section 1 and another pipe 12 leading to the lower section 2, said upper section being detachably connected by a flexible tube 13 with a pipe 14 from which the pipe 12 branches, a suitable coupling 15 being provided for connecting the tube 13 with the pipe 11 when the apparatus is set up for operation, and for disconnecting these parts when the upper section 1 is to be removed. Through a pipe 16, steam may be supplied to the pipe 14 to cure the tire, and when the curing operation is completed, the steam may be shut off by the valve 17. Another valve 18 in an additional pipe 19 may now be opened to supply water or any other cooling medium to the pipe 14 and from here to the mold sections 1 and 2, thus rapidly cooling the newly vulcanized tire and preventing the undesirable results which often occur when it is allowed to cool after removal from the mold. The steam or water is discharged from the upper and lower sections of the apparatus through pipes 11ª and 12ª respectively, the former being connected by a flexible tube 13ª with a main outlet pipe 14ª from which the pipe 12ª branches, a suitable connection 15ª being provided between the tube 13ª and pipe 11ª. If desired, the pipes 12ª and 14ª may be provided with valves 17ª and 18ª respectively.

Any preferred means may be employed for properly alining the two sections 1 and 2 and for detachably securing them together. I prefer, however, to provide the inner flanges 7 and 7ª with projecting ears 20 having openings to receive pins 21 carried by the lowermost of said ears, this arrangement being provided to aline the two sections properly, while bolts 22 pivoted to one section and receivable in notches 23 of the other section, may well be employed for securing the two sections together.

To prevent injury to the beads of the tire casing when lowering the upper mold section onto the lower, I provide the latter with a bead engaging band 30 secured by screws or the like 31 in the lower mold ring 5, or possibly integral therewith, as long as it projects vertically to form a flange around which the beads are stretched.

In connection with a mold constructed as above specified, I employ a pneumatic tube or core 24, but it is to be understood that any other type of core such as the usual sand bag might be used.

In operation, mold rings 5 having channels 9ª of the appropriate size are secured to the jacket rings 6; the tire casing with its covering of green rubber and with the air tube 24 in place, is positioned in the lower channel with the beads stretched around band 30, the stem 25 extending outwardly through an opening 26 in the band 30; by a suitable grapple or the like 27, the upper section 1 of the mold is now applied to the lower section without injuring the tire beads, due to the band 30, said mold sections being properly alined by the pins 21 and the openings with which they engage; the two sections are then tightly clamped together by means of the bolts 22, and steam or hot water is turned on to enter sections 1 and 2 for heating them to the proper temperature. The air tube 24 is now inflated and steam is supplied for the proper duration of time, such steam entering through the pipes 11 and 12 and escaping through the pipes 11ª and 12ª. When the curing operation is complete, the steam is cut off by means of the valve 17 and a cooling medium such as water is supplied to the two sections of the vulcanizer by opening the valve 18. The complete tire is thus rapidly cooled which is highly desirable. By releasing bolts 22, and the couplings 15 and 15ª, the upper section 1 of the vulcanizer may now be removed by using the grapple 27, but before so doing, the valves 11ᵇ, 11ᶜ and 12ᵇ are preferably closed to trap the contents of the jacket 9.

By constructing the device as or substantially as disclosed, the objects of the invention are effectively carried out in an expeditious manner, and since probably the best results are obtained from the details disclosed, they may well be followed. It is to be understood, however, that within the scope of the invention as claimed, numerous minor changes may well be made and in some instances the device might be used vertically rather than horizontally if desired.

I claim:

1. A tire vulcanizer comprising two sections each consisting of a jacket ring having projecting flanges on its inner and outer peripheries disposed in a common plane at right angles to the axis of the ring, said ring having a circumferential channel between said flanges opening on said plane, a plurality of mold rings for different sized tires, any one of said mold rings being receivable in said channel in spaced relation with the wall thereof, all of said mold rings having flanges on their inner and outer peripheries and of the same size as the jacket ring flanges; and quick-detachable means for tightly though detachably connecting the flanges of any jacket ring with those of said mold ring; together with means for detachably connecting the two sections, with the mold ring flanges of one section contacting with the corresponding flanges of the other section, and means for supplying a heating medium to the channels of the two jacket rings.

2. A tire vulcanizer comprising two sections each consisting of a jacket ring having projecting flanges on its inner and outer peripheries disposed in a common plane at right angles to the axis of the ring, said ring having a circumferential channel between said flanges opening on said plane, a plurality of mold rings for different sized tires, any one of said mold rings being receivable in said channel in spaced relation with the wall thereof, all of said mold rings having flanges on their inner and outer peripheries and of the same size as the jacket ring flanges, and means for tightly though detachably connecting the flanges of any jacket ring with those of said mold ring; together with means for detachably connecting the two sections, with the mold ring flanges of one section contacting with the corresponding flanges of the other section, a steam supply pipe, a water supply pipe, valves for both of said pipes, a common pipe into which either of said steam and water pipes may discharge when the proper valve is opened, a branch pipe leading from said common pipe into the channel of the lowermost of said jacket rings, a valve for said branch pipe, a flexible pipe connected with the upper end of said common pipe, a valved rigid pipe carried by and communicating with the channel of the upper jacket ring, a union connecting said flexible pipe with said rigid pipe, an outlet pipe leading from the lowermost jacket ring and having a valve, a short, valved pipe extending from the channel of the upper jacket ring, a flexible pipe and a union connecting it with said last named short pipe, a main discharge pipe to which said first named outlet pipe and said flexible pipe are connected, and a valve for said main discharge pipe.

In testimony whereof I have hereunto set my hand.

GEORGE B. COOPER.